(12) United States Patent
Zhang et al.

(10) Patent No.: US 12,264,997 B2
(45) Date of Patent: Apr. 1, 2025

(54) SYSTEM FOR SYNCHRONOUS MONITORING OF MULTI-POINT DISPLACEMENT AND ROTATION RESPONSES OF LARGE STRUCTURE, AND DATA ANALYSIS METHOD THEREFOR

(71) Applicant: Dongyu Zhang, Harbin (CN)

(72) Inventors: Dongyu Zhang, Harbin (CN); Li Ni, Harbin (CN)

( * ) Notice: Subject to any disclaimer, the term of this patent is extended or adjusted under 35 U.S.C. 154(b) by 228 days.

(21) Appl. No.: 18/008,995

(22) PCT Filed: May 13, 2021

(86) PCT No.: PCT/CN2021/093545
§ 371 (c)(1),
(2) Date: Dec. 8, 2022

(87) PCT Pub. No.: WO2022/142065
PCT Pub. Date: Jul. 7, 2022

(65) Prior Publication Data
US 2023/0280236 A1    Sep. 7, 2023

(30) Foreign Application Priority Data
Dec. 30, 2020    (CN) .......................... 202011626873.5

(51) Int. Cl.
*G01M 5/00*        (2006.01)
*G01B 11/00*       (2006.01)

(52) U.S. Cl.
CPC ........... *G01M 5/005* (2013.01); *G01B 11/005* (2013.01)

(58) Field of Classification Search
CPC ......... G01B 11/16; G01B 11/18; G01B 11/02; G01B 11/165; G01B 9/02091;
(Continued)

(56) References Cited

FOREIGN PATENT DOCUMENTS

| CN | 1912536 A | * | 2/2007 |
|----|-----------|---|--------|
| CN | 103105140 A |   | 5/2013 |

(Continued)

*Primary Examiner* — Michael P Stafira
(74) *Attorney, Agent, or Firm* — IPro, PLLC (57) ABSTRACT

The present invention relates to a system for synchronous monitoring of multi-point displacement and rotation responses of a large structure, and a data analysis method therefor, and belongs to the technical field of structural health monitoring engineering. The system includes a laser sensor and a laser receiver. A laser device is disposed inside the laser sensor and is capable of emitting laser, and laser emitted by the laser device is received by the laser receiver. The displacement and rotation responses at a monitoring point of the large structure drive displacement and pointing direction of laser produced by the laser sensor to change, and the change is received by an internal measurement system of the laser receiver. The displacement and rotation responses at the monitoring point of the large structure can be inversely calculated based on internal measurement data of the laser receiver according to the data analysis method for the system for synchronous monitoring of the multi-point displacement and rotation responses of the large structure provided by the present invention. By means of the system for synchronous monitoring of the multi-point displacement and rotation responses of the large structure, long-term real-time monitoring of multi-point displacement of large civil engineering structures such as bridges, tunnels and high-rise buildings can be realized.

8 Claims, 3 Drawing Sheets

(58) Field of Classification Search
CPC .......... G01B 11/24; G01B 9/02; G01B 11/00; G01B 21/32; G01B 9/02003; G01B 2290/45; G01B 2290/70; G01B 7/16; G01B 11/002; G01B 11/161; G01B 11/26; G01B 9/0209; G01B 7/18; G01B 9/02044; G01B 9/02083; G01B 9/02004; G01B 11/2441; G01B 7/02; G01B 9/02007; G01B 9/02027; G01B 11/022; G01B 11/0608; G01B 11/14; G01B 9/02069; G01B 11/03; G01B 11/272; G01B 21/22; G01B 11/026; G01B 9/02002; G01B 9/02087; G01B 9/0201; G01B 21/00; G01B 17/04; G01B 21/042; G01B 9/02049; G01B 11/06; G01B 21/02; G01B 9/02014; G01B 9/02081; G01B 11/005; G01B 11/25; G01B 11/306; G01B 9/02064; G01B 9/04; G01B 11/168; G01B 11/245; G01B 11/2513; G01B 15/06; G01B 17/02; G01B 5/0004; G01B 5/30; G01B 9/02008; G01B 9/02043; G01B 9/02079; G01B 17/00; G01B 15/00; G01B 2210/56; G01B 5/008; G01B 9/02016; G01B 9/02028; G01B 9/02032; G01B 9/02045; G01B 9/02075; G01B 9/02084; G01B 11/0633; G01B 11/22; G01B 11/065; G01B 11/0683; G01B 11/167; G01B 11/2408; G01B 11/255; G01B 21/045; G01B 2210/58; G01B 2290/60; G01B 9/0205; G01B 9/02068; G01B 9/02072; G01B 11/08; G01B 11/2433; G01B 11/2545; G01B 11/28; G01B 2290/65; G01B 5/0014; G01B 7/22; G01B 9/02012; G01B 9/02039; G01B 9/02058; G01B 9/02077; G01B 9/02082; G01B 11/043; G01B 11/12; G01B 11/27; G01B 11/30; G01B 21/20; G01B 7/023; G01B 9/02011; G01B 9/02015; G01B 9/02057; G01B 9/02067; G01B 9/02088; G01B 11/024; G01B 11/04; G01B 11/10; G01B 11/2518; G01B 13/02; G01B 21/04; G01B 21/047; G01B 21/085; G01B 21/28; G01B 3/02; G01B 5/0007; G01B 5/24; G01B 7/066; G01B 7/30; G01B 9/02005; G01B 9/02019; G01B 9/02029; G01B 9/0203; G01B 9/02036; G01B 9/02037; G01B 9/02041; G01B 9/02089; G01B 11/007; G01B 11/046; G01B 11/0691; G01B 11/2509; G01B 11/2522; G01B 11/2527; G01B 11/254; G01B 11/2755; G01B 11/303; G01B 13/18; G01B 13/24; G01B 15/02; G01B 15/04; G01B 17/06; G01B 21/16; G01B 21/18; G01B 21/24; G01B 2210/16; G01B 2290/25; G01B 2290/35; G01B 5/0025; G01B 5/0028; G01B 5/02; G01B 7/004; G01B 7/026; G01B 7/04; G01B 7/042; G01B 7/063; G01B 7/14; G01B 7/24; G01B 7/28; G01B 7/305; G01B 9/02001; G01B 9/02021; G01B 9/02035; G01B 9/02052; G01B 9/02056; G01B 9/02063; G01B 9/02078; G01B 9/02085; G01B 9/10; G01M 5/0066; G01M 5/0091; G01M 5/0033; G01M 5/0041; G01M 5/0008; G01M 11/085; G01M 5/0058; G01M 3/24; G01M 11/083; G01M 5/0025; G01M 11/331; G01M 5/0083; G01M 7/00; G01M 11/086; G01M 11/3109; G01M 3/04; G01M 5/00; G01M 3/26; G01M 3/38; G01M 99/00; G01M 11/39; G01M 5/005; G01M 3/2815; G01M 5/0016; G01M 3/20; G01M 3/2807; G01M 13/00; G01M 3/243; G01M 7/025; G01M 3/047; G01M 7/08; G01M 11/30; G01M 3/00; G01M 3/007; G01M 3/28; G01M 11/088; G01M 5/0075; G01M 11/00; G01M 13/021; G01M 7/02; G01M 99/007; G01M 11/319; G01M 15/08; G01M 3/207; G01M 11/3172; G01M 3/3254; G01M 3/3263; G01M 7/022; G01M 11/0271; G01M 11/081; G01M 3/002; G01M 1/12; G01M 1/22; G01M 10/00; G01M 11/025; G01M 11/3181; G01M 17/027; G01M 9/06; G01M 1/08; G01M 11/005; G01M 11/02; G01M 11/0228; G01M 11/3127; G01M 11/3136; G01M 11/3145; G01M 11/33; G01M 11/333; G01M 11/35; G01M 15/05; G01M 17/007; G01M 3/40; G01M 1/14; G01M 11/0207; G01M 11/08; G01M 11/3118; G01M 13/028; G01M 13/04; G01M 15/12; G01M 17/02; G01M 17/04; G01M 17/08; G01M 3/02; G01M 3/025; G01M 3/2869; G01M 3/3236; G01M 99/002; G01M 99/008

See application file for complete search history.

(56) References Cited

FOREIGN PATENT DOCUMENTS

| | | | | |
|---|---|---|---|---|
| CN | 104390633 | A | | 3/2015 |
| CN | 204346386 | U | * | 5/2015 |
| CN | 103105140 | B | * | 3/2016 ............. G01B 11/16 |
| CN | 104390633 | B | * | 8/2016 ........... G01C 15/002 |
| CN | 107631693 | A | * | 1/2018 |
| CN | 108007376 | A | * | 5/2018 ............. G01B 11/16 |
| CN | 108150154 | A | * | 6/2018 |
| CN | 109269417 | A | * | 1/2019 |
| CN | 109405764 | A | | 3/2019 |
| CN | 109458991 | A | * | 3/2019 |
| CN | 109959343 | A | * | 7/2019 ............. G01B 11/16 |
| CN | 110319777 | A | * | 10/2019 |
| CN | 111397589 | A | * | 7/2020 ............. G01B 11/16 |
| CN | 107860317 | B | * | 10/2020 ............. G01B 11/02 |
| CN | 111750798 | A | | 10/2020 |
| CN | 115031630 | A | * | 9/2022 |
| CN | 115096191 | A | * | 9/2022 |
| KR | 101504076 | B1 | | 3/2015 |

* cited by examiner

FIG. 4

SYSTEM FOR SYNCHRONOUS MONITORING OF MULTI-POINT DISPLACEMENT AND ROTATION RESPONSES OF LARGE STRUCTURE, AND DATA ANALYSIS METHOD THEREFOR

TECHNICAL FIELD

The present invention relates to a system for synchronous monitoring of multi-point displacement and rotation responses of a large structure, and a data analysis method therefor, and belongs to the technical field of structural health monitoring engineering.

BACKGROUND

Large civil engineering infrastructures such as bridges, tunnels and high-rise buildings are the basis for the normal operation of modern society. However, during the long-term use of civil engineering structures, due to the coupling effect of various factors, such as material aging, environmental erosion and extreme loads, the structural damage accumulates continuously and the bearing capacity decreases, which affects the safe use of the structures. In order to more accurately understand the structural safety status during service, structural health monitoring systems are installed in a large number of civil engineering structures. The structural health monitoring system measures various structural responses in terms of displacement, deformation, tilt, rotation and vibration by placing sensors on the structure, and evaluates the operational status of the structure through in-depth analysis of monitoring data. Among the various types of structural responses monitored by the structural health monitoring system, a structural displacement response is critical for assessing the safety of the overall structure.

In order to accurately measure the displacement response of large civil engineering structures such as bridges, tunnels and high-rises, many scholars at home and abroad have proposed a lot of structural displacement response monitoring methods based on different monitoring principles, mainly including: a pressure communicating vessel, a measured acceleration/velocity response integral method, a total station-based measurement method, a computer vision-based structural displacement monitoring method and a laser projection spot-based monitoring method. The pressure communicating vessel is based on the principle of pressure balance of liquid in a communicating tube, so the pressure communicating vessel may only monitor a vertical displacement response of the structure. In addition, due to poor dynamic response frequency, it is difficult for the pressure communicating vessel to accurately monitor high-frequency vibration of the structure. When the measured acceleration/velocity response integral method is used for long-term monitoring of structural displacement, integration results are prone to drift, and a correct structural displacement response may not be obtained. The total station-based measurement method is mainly used for periodically measuring displacement of the structure, and may measure the displacement of only one monitoring point of the structure at each moment, which cannot meet the requirement for continuous monitoring of structural multi-point displacement responses. In the computer vision-based structural displacement monitoring method, an industrial camera is used for taking a picture of structural displacement monitoring points, and the structural displacement responses are calculated through pixel movement of monitoring points in the picture. However, the computer vision-based structural displacement monitoring method has high requirements for cameras and lenses, and testing accuracy is influenced by light exposure, which makes it difficult to realize 24-hour monitoring around the clock. The laser projection spot-based monitoring method is that a laser device is mounted on the structure, laser emitted by the laser device is projected on a distant target and forms a spot, the spot moves on the target due to structural displacement, and a camera mounted on the target recognizes spot displacement through computer vision technology, such that the structural displacement response is obtained. However, the movement of the laser spot on the target is not only related to structural displacement of a position where the laser device is mounted, but also related to a rotation response of the structure. As a result, when the structure has the rotation response at the same time, the corresponding structural displacement response may not be directly obtained from spot displacement simply.

Thus, it is of great practical value to develop technology that may efficiently monitor multi-point displacement of large structures simultaneously.

SUMMARY

The present invention aims to provide a system for synchronous monitoring of multi-point displacement and rotation responses of a large structure, and a data analysis method therefor, in order to solve the problems that existing structural displacement monitoring technology is complicated and costly, and it is difficult to realize simultaneous monitoring of the multi-point displacement and rotation responses of the large structure.

The present invention provides a system for synchronous monitoring of multi-point displacement and rotation responses of a large structure. The system includes a laser sensor mounted at a monitoring point of the large structure, and a laser receiver mounted at a fixed position, a laser device is disposed inside the laser sensor, and the laser receiver is disposed on an optical path of the laser sensor.

Further, laser sensors are mounted at each monitoring point of the large structure, and each laser receiver receives laser emitted by at least one laser sensor. Each laser receiver may receive laser emitted by a plurality of laser sensors.

Further, a laser sensor housing is tightly connected to the to-be-measured structure so as to ensure that displacement and rotation responses of the laser sensor are the same as those of the structure.

Further, a horizontal pointing direction of the laser device is adjusted through a horizontal adjustment nut of the laser sensor, and a vertical pointing direction of the laser device is adjusted through a vertical adjustment nut of the laser sensor. Before measurement of the structural displacement and rotation responses, laser emitted by the laser device is made to point to a laser receiving window of the laser receiver.

Further, the laser receiver includes: the laser receiving window for receiving laser emitted by the laser sensors, a tilting plate adjustable in angle, a tilting target capable of reflecting laser, a front camera for photographing the tilting target, a top plane reflecting mirror, a bottom plane reflecting mirror, a non-reflective target, and a rear camera for photographing the non-reflective target; and the laser receiving window is disposed at a front end of the laser receiver, the tilting plate is disposed at a front bottom of the laser receiver, the tilting target is laid on a surface of the tilting plate, the front camera is mounted on a front top of the laser receiver, a lens of the front camera faces the tilting target, the top plane reflecting mirror is disposed on a top of the laser receiver, the bottom plane reflecting mirror is disposed at a middle bottom of the laser receiver, the non-reflective target is disposed at a rear bottom of the laser receiver, the rear camera is mounted at a rear top of the laser receiver, and a lens of the rear camera faces the non-reflective target.

Further, the laser receiver further includes a rotating shaft capable of rotating freely and a supporting rod with a changeable length, a front part of the tilting plate is rotatably connected to a bottom plate of the laser receiver through the rotating shaft, and a rear part of the tilting plate is connected to the bottom plate of the laser receiver through the supporting rod. A tilt angle of the tilting target may be changed by changing the length of the supporting rod.

Further, the top plane reflecting mirror and the bottom plane reflecting mirror are parallel.

Further, the tilting target and the non-reflective target are marked with scales.

Further, before the measurement of the structural displacement and rotation responses, the pointing direction of the laser receiving window of the laser receiver and the tilt angle of the tilting target are adjusted, such that the laser emitted by the laser sensor may irradiate the tilting target capable of reflecting laser and the non-reflective target respectively.

A data analysis method for a system for synchronous monitoring of multi-point displacement and rotation responses of a large structure is based on the above system for synchronous monitoring of the multi-point displacement and rotation responses of the large structure. The method for analyzing structural displacement and rotation response data monitored by a single laser sensor includes the following steps:

step 1: determining an internal three-dimensional spatial coordinate system of a laser receiver, where an x-axis and a z-axis are parallel to a bottom surface of the laser receiver for receiving laser, and a y-axis is perpendicular to the bottom surface of the laser receiver for receiving laser;

step 2: selecting structural displacement and rotation responses at a certain moment as a monitoring reference value, expressing structural displacement and rotation responses at other moments as offsets relative to the reference value, and establishing a measurement plane corresponding to the monitoring reference value for the structural displacement and rotation responses according to the operations in steps 3 to 10;

step 3: taking a picture of a spot projected by laser emitted by the laser sensor on a tilting target through a front camera, and identifying position coordinates of a laser spot center point at an intersection point in a plane of the tilting target through image recognition technology in combination with coordinates of a scale on the tilting target in the picture;

step 4: taking a picture of a spot projected by the laser emitted by the laser sensor on a non-reflective target through a rear camera, and identifying position coordinates of a laser spot center point at an intersection point in a plane of the non-reflective target through the image recognition technology in combination with coordinates of a scale on the non-reflective target in the picture;

step 5: obtaining three-dimensional spatial coordinates of the spot center points in the internal coordinate system of the laser receiver through geometric relationship conversion according to an internal component size of the laser receiver, the plane coordinates of the laser spot center point on the tilting target, the plane coordinates of the laser spot center point on the non-reflective target, and an angle between the tilting target and a bottom plate of the laser receiver;

step 6: establishing a virtual image target of the non-reflective target above the laser receiver, where the virtual image target is parallel to the non-reflective target, a vertical distance from the non-reflective target is (n+1)H, H is a vertical distance between a top plane reflecting mirror and a bottom plane reflecting mirror, n is the number of laser reflections between the top plane reflecting mirror and the bottom plane reflecting mirror, the spot center point B1 on the non-reflective target is projected vertically onto the virtual image target to form an intersection point C1, and since the intersection point C1 has the same x-axis and z-axis coordinates in the coordinate system of the laser receiver as the spot center point B1, spatial coordinates of the intersection point C1 in the coordinate system of the laser receiver are obtained through calculation;

step 7: based on the fact that the intersection point C1 is on an extension line of reflected laser from the tilting target according to a geometric reflection relationship, establishing an equation of a straight line passing through the intersection point C1 and the spot center point A1 in space according to the coordinates of the intersection point C1 and the spot center point A1 in the coordinate system of the laser receiver;

step 8: obtaining, according to a principle that an angle between incident laser and a normal of a flat mirror is equal to an angle between reflected laser and the normal of the flat mirror when laser is reflected by the tilting target, an equation of a straight line in space of incident laser passing through the spot center point A1 on the tilting target;

step 9: establishing, according to the equation of the straight line in space of the incident laser passing through the spot center point A1 on the tilting target, a structural displacement and rotation response projection plane that passes through the spot center point A1 on the tilting target and is perpendicular to the equation of the straight line in space of the incident laser, and setting an origin of coordinates of the projection plane at the spot center point A1;

step 10: establishing the structural displacement and rotation response measurement plane parallel to the projection plane at a point D1 of a front end of the laser sensor, where an origin of coordinates of the measurement plane is set at the point D1, when the structural displacement and rotation responses are taken as a reference value, laser emitted by the laser sensor passes through the origin of the measurement plane and is perpendicular to the measurement plane, and in-plane coordinate systems of the measurement plane and the projection plane are parallel;

step 11: based on the fact that when the structure is translated and rotated with respect to the reference value thereof, a position and pointing direction of the laser emitted by the laser sensor are changed, resulting in a change in positions of spots projected by the laser on the tilting target and the non-reflective target in the laser receiver, assuming that the laser sensor produces translation by $(x_0, y_0)$ in the measurement plane and generates a rotation angle $(\theta_x, \theta_y)$ around the x-axis and the y-axis;

step 12: taking a picture of a spot projected by laser emitted by the laser sensor after the translation and rotation on the tilting target through the front camera, and identifying position coordinates of a laser spot center point A2 at an intersection point in the plane of the tilting target through the image recognition technology in combination with the coordinates of the scale on the tilting target in the picture;

step 13: taking a picture of a spot projected by the laser emitted by the laser sensor after the translation and rotation on the non-reflective target through the rear camera, and identifying position coordinates of a laser spot center point B2 at an intersection point in the plane of the non-reflective target through the image recognition technology in combination with the coordinates of the scale on the non-reflective target in the picture;

step 14: obtaining three-dimensional spatial coordinates of the spot center points A2 and B2 in the internal coordinate system of the laser receiver through geometric relationship conversion according to the internal component size of the laser receiver, the plane coordinates of the laser spot center point A2 on the tilting target, the plane coordinates of the laser spot center point B2 on the non-reflective target, and the angle between the tilting target and the bottom plate of the laser receiver;

step 15: vertically projecting the spot center point B2 on the non-reflective target onto the virtual image target to form an intersection point C2, where since the intersection point C2 has the same x-axis and z-axis coordinates in the coordinate system of the laser receiver as the spot center point B2, spatial coordinates of the intersection point C2 in the coordinate system of the laser receiver may be obtained;

step 16: based on the fact that the intersection point C2 is on an extension line of reflected laser passing through the spot center point A2 on the tilting target according to the geometric reflection relationship, establishing an equation of a straight line passing through the intersection point C2 and the spot center point A2 in space according to the coordinates of the intersection point C2 and the spot center point A2 in the coordinate system of the laser receiver;

step 17: assuming that after translation and rotation of the laser sensor, the point D1 of the front end is moved to a point D2, calculating, according to the principle that the angle between the incident laser and the normal of the flat mirror is equal to the angle between the reflected laser and the normal of the flat mirror when laser is reflected by the tilting target, an equation of a straight line where the incident light is located after translation and rotation of the laser sensor, that is, an equation of a straight line passing through the spot center point A2 and the point D2 of the front end;

step 18: calculating, according to a geometric relationship, an angle between a straight line passing through the two points A1 and D1 and a straight line passing through the two points A2 and D2, where the angle is a rotation response of the laser sensor, and the angle is projected onto an x-axis and a y-axis of the measurement plane to obtain the rotation response $(\theta_x, \theta_y)$ of the laser sensor in the two directions;

step 19: calculating, according to the geometric relationship, an intersection point F of the straight line passing through the two points A2 and D2 and the projection plane, and coordinates (x, y) of the point F in the projection plane; and step 20: obtaining, according to the geometric relationship, translation responses of the laser sensor in the x-axis and the y-axis of the measurement plane as $x_0=x-L\theta_x$ and $y_0=y-L\theta_y$, respectively, where L is a distance from the point D1 of the front end of the laser sensor to the spot center point A1 on the tilting target in the laser receiver when the laser sensor is in a reference position.

Further, when the multi-point displacement and rotation responses of the structure need to be monitored, by increasing areas of the tilting target capable of reflecting laser and the non-reflective target in the laser receiver, and by adjusting a pointing direction of laser emitted by different laser sensors, the laser of the different laser sensors irradiates different regions of the tilting target and the non-reflective target at the same time, and structural displacement and rotation responses of different positions corresponding to each laser sensor are calculated respectively according to the data analysis method for the system for synchronous monitoring of the multi-point displacement and rotation responses of the large structure in claim 8.

Further, when the multi-point displacement and rotation responses of the structure may not be monitored by increasing areas of the tilting target and the non-reflective target, a time-division multiplexing method is used to control an emission status of laser emitted by different laser sensors through remote control, the different laser sensors irradiate laser to the laser receiver at different moments, and only one laser sensor irradiates laser to the laser receiver at each moment. The structural displacement and rotation responses of different positions corresponding to each laser sensor are calculated respectively according to the data analysis method for the system for synchronous monitoring of the multi-point displacement and rotation responses of the large structure in claim 8.

The present invention mainly has the following advantages:

According to the system for synchronous monitoring of the multi-point displacement and rotation responses of the structure of the present invention, two laser spot image recognition systems and one optical reflection system are set in the laser receiver, and the unique method for processing monitoring data is provided, thereby realizing synchronous monitoring of the structural displacement and rotation responses.

According to the system for synchronous monitoring of the multi-point displacement and rotation responses of the structure of the present invention, one laser receiver can be used for simultaneously receiving laser emitted by laser sensors mounted at a plurality of positions of the structure, thereby realizing synchronous monitoring of the structural displacement and rotation responses at the positions.

According to the system for synchronous monitoring of the multi-point displacement and rotation responses of the large structure and the data analysis method therefor of the present invention, the system for synchronous monitoring of the multi-point displacement and rotation responses of the structure can increase the distance between the spot center point C1 on the virtual image target and the spot center point A1 on the tilting target by adjusting the tilt angle of the tilting target and increasing the number of reflections of incident light of the laser sensors between the top plane reflecting mirror and the bottom plane reflecting mirror of the laser receiver. By increasing the distance from the point C1 to the point A1, an error in tilt angle calculation of a straight-line equation (C1-A1) caused by a spot center identification error can be reduced, and thus the accuracy of monitoring for the structural rotation response is improved.

DETAILED DESCRIPTION OF EMBODIMENTS

The technical solutions in the embodiments of the present invention will be clearly and completely described below with reference to the accompanying drawings in the embodiments of the present invention. It is apparent that the described embodiments are only a part of the embodiments of the present invention, rather than all the embodiments. Based on the embodiments of the present invention, all other embodiments obtained by those of ordinary skill in the art without creative efforts shall fall within the protection scope of the present invention.

A system for synchronous monitoring of multi-point displacement and rotation responses of a large structure of this implementation is illustrated with reference to FIG. 1 to FIG. 4. The system includes a laser sensor 1 mounted at a monitoring point of the large structure, and a laser receiver 2 mounted at a fixed position.

Figure 1:
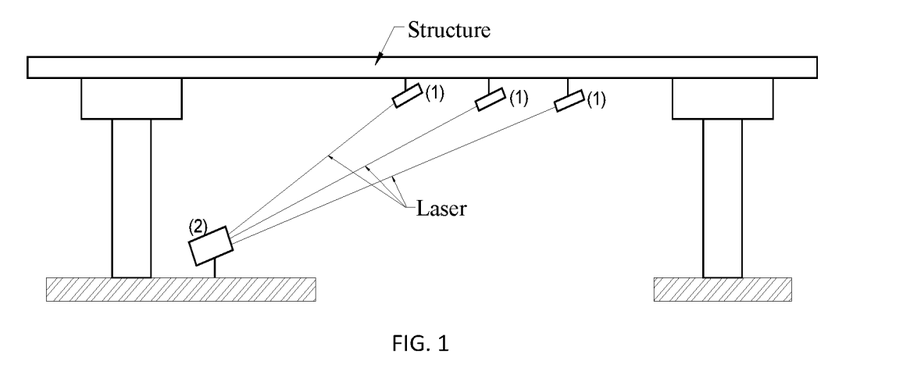
FIG. 1 is a schematic diagram of composition of a system for synchronous monitoring of multi-point displacement and rotation responses of a large structure according to the present invention.
Figure 2:
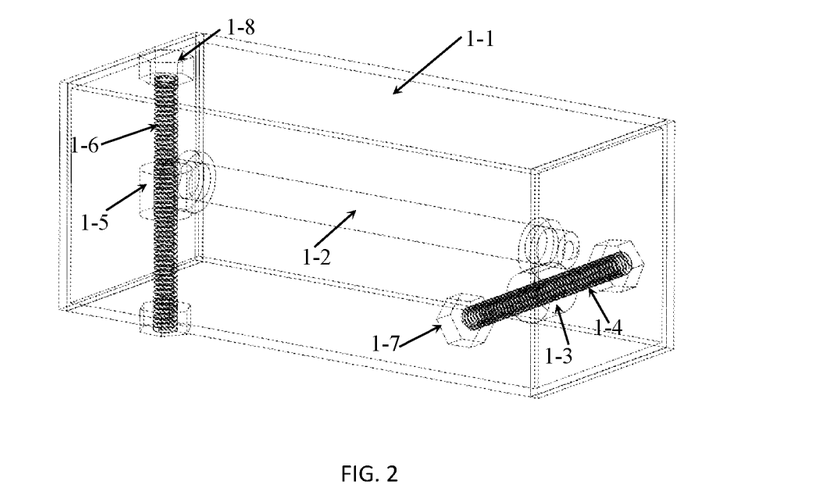
FIG. 2 is a diagram of an internal structure of a laser sensor according to the present invention.

A laser sensor 1 is mounted at each displacement response monitoring point of the large structure, and a laser device adjustable in direction is disposed inside the laser sensor. It is ensured that the laser sensors are tightly and firmly connected to the structure. The laser receiver 2 is mounted at the fixed point. The direction of the laser device inside the laser sensor 1 is adjusted through a horizontal adjustment nut and a vertical adjustment nut in the laser sensor 1, such that laser emitted by the laser device points to the laser receiver 2.

Figure 3:
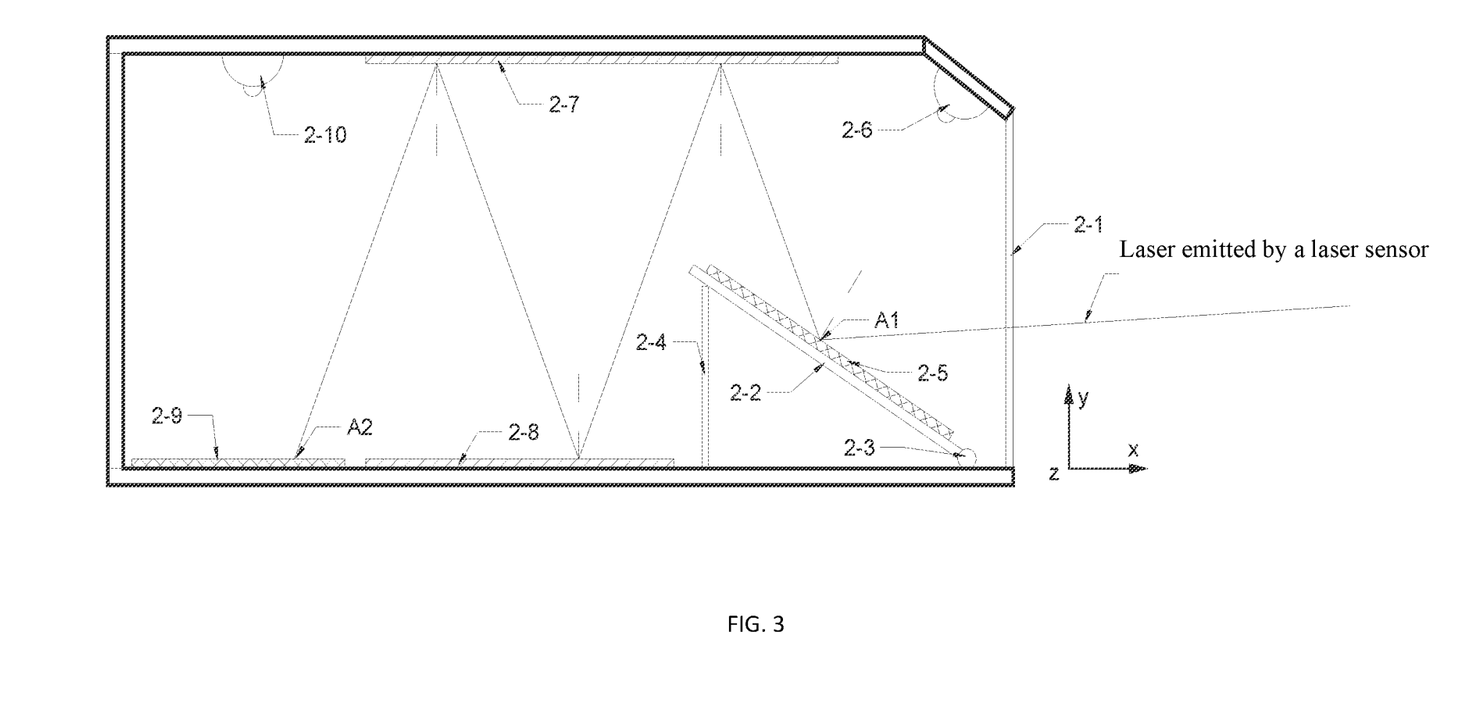
FIG. 3 is a cross-sectional view of an internal structure of a laser receiver according to the present invention.

By adjusting a pointing direction of a laser receiving window 2-1 of the laser receiver 2 and adjusting a tilt angle of a tilting target 2-5 inside the laser receiver 2, laser emitted by all the laser sensors 1 may irradiate the tilting target 2-5 and a non-reflective target 2-9 in the laser receiver 2, and spots produced by the laser emitted by each laser sensor 1 on the tilting target 2-5 and the non-reflective target 2-9 do not overlap. When it is impossible to ensure that the spots produced by the laser emitted by all the laser sensors 1 on the tilting target 2-5 and the non-reflective target 2-9 do not overlap, a time-division multiplexing method may be used to control an emission status of the laser emitted by different laser sensors 1 through remote control, and the different laser sensors 1 irradiate laser to the laser receiver at different moments, so as to ensure that the spots produced by the different laser sensors 1 on the tilting target 2-5 and the non-reflective target 2-9 do not overlap at each moment.

For the spots produced by each laser sensor on the tilting target 2-5 and the non-reflective target 2-9 in the laser receiver 2, the displacement and rotation responses of each monitoring point of the structure are calculated according to a data analysis method for the system for synchronous monitoring of the multi-point displacement and rotation responses of the large structure. The method specifically includes the following steps:

Step 1: Determine an internal three-dimensional spatial coordinate system of a laser receiver 2. The coordinate system is set as shown in FIG. 2, where an x-axis and a z-axis are parallel to a bottom surface of the laser receiver 2, and a y-axis is perpendicular to the bottom surface of the laser receiver 2.

Step 2: As shown in FIG. 3, select structural displacement and rotation responses at a certain moment as a monitoring reference value, express structural displacement and rotation responses at other moments as offsets relative to the reference value, and establish a measurement plane 2-13 corresponding to the monitoring reference value for the structural displacement and rotation responses according to operations in steps 3 to 10.

Step 3: Take a picture of a spot projected by laser emitted by the laser sensor 1 on a tilting target 2-5 through a front camera 2-6, and identify position coordinates of a laser spot center point A1 at an intersection point in a plane of the tilting target through image recognition technology in combination with coordinates of a scale on the tilting target 2-5 in the picture.

Step 4: Take a picture of a spot projected by the laser emitted by the laser sensor 1 on a non-reflective target 2-9 through a rear camera 2-10, and identify position coordinates of a laser spot center point B1 at an intersection point in a plane of the non-reflective target through the image recognition technology in combination with coordinates of a scale on the non-reflective target 2-9 in the picture.

Step 5: Obtain three-dimensional spatial coordinates of the spot center points A1 and B1 in the internal coordinate system of the laser receiver 2 through geometric relationship conversion according to the internal component size of the laser receiver 2, the plane coordinates of the laser spot center point A1 on the tilting target 2-5, the plane coordinates of the laser spot center point B1 on the non-reflective target 2-9, and the angle between the tilting target 2-5 and a bottom plate of the laser receiver.

Figure 4:
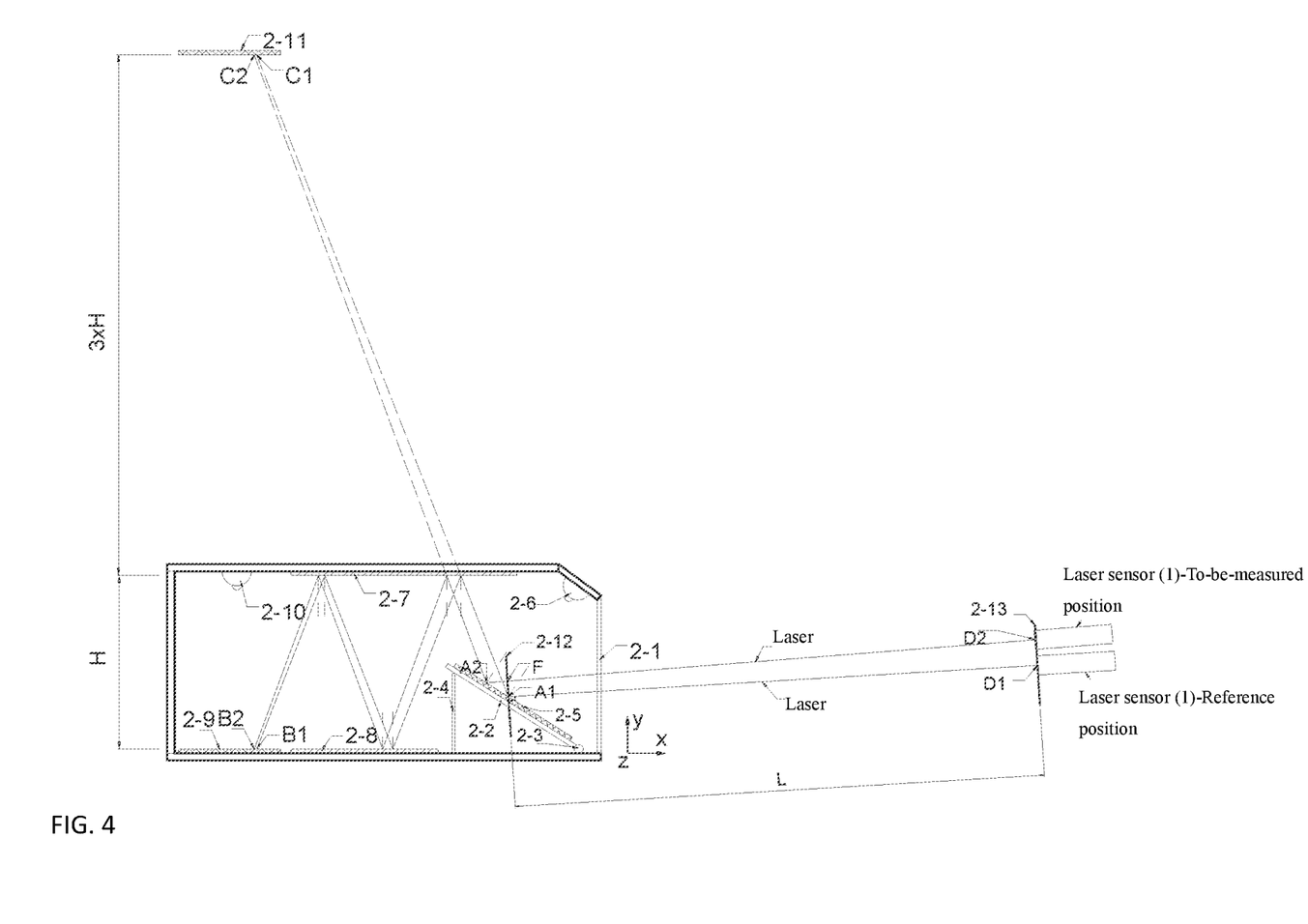
FIG. 4 is a schematic diagram of a measurement principle based on a system for synchronous monitoring of multi-point displacement and rotation responses of a large structure according to the present invention.

Step 6: Establish a virtual image target 2-11 of the non-reflective target 2-9 above the laser receiver. The virtual image target 2-11 is parallel to the non-reflective target 2-9, and a vertical distance from the non-reflective target 2-9 is (n+1)H, where H is a vertical distance between a plane reflecting mirror 2-7 and a plane reflecting mirror 2-8, and n is the number of laser reflections between the plane reflecting mirror 2-7 and the plane reflecting mirror 2-8. The spot center point B1 on the non-reflective target is projected vertically onto the virtual image target 2-11 to form an intersection point C1. Since the intersection point C1 has the same x-axis and z-axis coordinates in the coordinate system of the laser receiver as the spot center point B1, spatial coordinates of the intersection point C1 in the coordinate system of the laser receiver 2 may be obtained.

Step 7: Based on the fact that the intersection point C1 is on an extension line of reflected laser from the tilting target according to a geometric reflection relationship, establish an equation of a straight line passing through the two points C1 and A1 in space according to the coordinates of the intersection point C1 and the spot center point A1 in the coordinate system of the laser receiver (2).

Step 8: Obtain, according to a principle that the angle between incident laser and the normal of a flat mirror is equal to the angle between reflected laser and the normal of the flat mirror when laser is reflected by the tilting target, an equation of a straight line in space of incident laser passing through the spot center point A1 on the tilting target 2-5.

Step 9: Establish, according to the equation of the straight line in space of the incident laser passing through the spot center point A1 on the tilting target 2-5, a structural displacement and rotation response projection plane 2-12 that passes through the spot center point A1 on the tilting target 2-5 and is perpendicular to the equation of the straight line in space of the incident laser, and set an origin of coordinates of the projection plane 2-12 at the spot center point A1.

Step 10: Establish the structural displacement and rotation response measurement plane 2-13 parallel to the projection plane 2-12 at a point D1 of a front end of the laser sensor 1. An origin of coordinates of the measurement plane 2-13 is set at the point D1. When the structural displacement and rotation responses are taken as a reference value, laser emitted by the laser sensor 1 passes through the origin of the measurement plane 2-13 and is perpendicular to the measurement plane 2-13. In-plane coordinate systems of the measurement plane 2-13 and the projection plane 2-12, that is the x-axis and the y-axis, are parallel.

Step 11: Based on the fact that when the structure is translated and rotated with respect to the reference value thereof, a position and pointing direction of the laser emitted by the laser sensor 1 are changed, resulting in a change in positions of spots projected by the laser on the tilting target 2-5 and the non-reflective target 2-9 in the laser receiver 2, assume that the laser sensor 1 produces translation by ($x_0$, $y_0$) in the measurement plane 2-13 and generates a rotation angle ($\theta_x$, $\theta_y$) around the x-axis and the y-axis.

Step 12: Take a picture of a spot projected by laser emitted by the laser sensor 1 after the translation and rotation on the tilting target 2-5 through the front camera 2-6, and identify position coordinates of a laser spot center point A2 at an intersection point in the plane of the tilting target through the image recognition technology in combination with the coordinates of the scale on the tilting target 2-5 in the picture.

Step 13: Take a picture of a spot projected by the laser emitted by the laser sensor 1 after the translation and rotation on the non-reflective target 2-9 through the rear camera 2-10, and identify position coordinates of a laser spot center point B2 at an intersection point in the plane of the non-reflective target through the image recognition technology in combination with the coordinates of the scale on the non-reflective target 2-9 in the picture.

Step 14: Obtain three-dimensional spatial coordinates of the spot center points A2 and B2 in the internal coordinate system of the laser receiver 2 through geometric relationship conversion according to the internal component size of the laser receiver 2, the plane coordinates of the laser spot center point A2 on the tilting target 2-5, the plane coordinates of the laser spot center point B2 on the non-reflective target 2-9, and the angle between the tilting target 2-5 and the bottom plate of the laser receiver.

Step 15: Vertically project the spot center point B2 on the non-reflective target 2-9 onto the virtual image target 2-11 to form an intersection point C2. Since the intersection point C2 has the same x-axis and z-axis coordinates in the coordinate system of the laser receiver 2 as the spot center point B2, spatial coordinates of the intersection point C2 in the coordinate system of the laser receiver may be obtained.

Step 16: Based on the fact that the intersection point C2 is on an extension line of reflected laser passing through the point A2 on the tilting target according to the geometric reflection relationship, establish an equation of a straight line passing through the two points C2 and A2 in space according to the coordinates of the intersection point C2 and the spot center point A2 in the coordinate system of the laser receiver 2.

Step 17: Calculate, according to the principle that the angle between the incident laser and the normal of the flat mirror is equal to the angle between the reflected laser and the normal of the flat mirror when laser is reflected by the tilting target, an equation of a straight line where the incident light is located after translation and rotation of the laser sensor 1, that is, an equation of a straight line passing through the two points A2 and D2.

Step 18: Calculate, according to a geometric relationship, an angle between a straight line passing through the two points A1 and D1 and the straight line passing through the two points A2 and D2. The angle is a rotation response of the laser sensor 1. The angle is projected onto an x-axis and a y-axis of the measurement plane 2-13 to obtain the rotation response ($\theta_x$, $\theta_y$) of the laser sensor 1 in the two directions.

Step 19: Calculate, according to the geometric relationship, an intersection point F of the straight line passing through the two points A2 and D2 and the projection plane 2-12, and coordinates (x, y) of the point F in the projection plane 2-12.

Step 20: Obtain, according to the geometric relationship, translation responses of the laser sensor 1 in the x-axis and the y-axis of the measurement plane 2-13 as $x_0=x-L\theta_x$ and $y_0=y-L\theta_y$, respectively, where L is a distance from the point D1 of the laser sensor 1 to the spot center point A1 on the tilting target in the laser receiver 2 when the laser sensor 1 is in a reference position.

When three-dimensional translation and rotation responses of monitoring points of the structure need to be measured, two or more laser sensors 1 may be mounted simultaneously at the monitoring points, and each laser sensor irradiates laser receivers 2 at different positions. Each laser receiver 2 calculates a structural displacement and rotation response projection of three-dimensional displacement and rotation of the structure in the measurement plane 2-13 of the laser receiver 2 according to the steps in claim 8. The three-dimensional translation and rotation responses of the structure are then calculated synthetically based on spatial positions of the different laser receivers 2 relative to the monitoring points of the structure.

The invention claimed is:

1. A system for synchronous monitoring of multi-point displacement and rotation responses of a structure, characterized in that the system comprises a laser sensor mounted at a monitoring point of the structure, and a laser receiver mounted at a fixed position,
wherein a laser device is disposed inside the laser sensor, and wherein the laser receiver is disposed on an optical path of the laser sensor;
wherein laser sensors are mounted at each monitoring point of the structure, and each laser receiver receives laser emitted by at least one laser sensor;
wherein the laser receiver comprises: a laser receiving window for receiving laser emitted by the laser sensor, a tilting plate adjustable in angle, a tilting target capable of reflecting laser, a front camera for photographing the tilting target, a plane reflecting mirror, a plane reflecting mirror, a non-reflective target, and a rear camera for photographing the non-reflective target; and the laser receiving window is disposed at a front end of the laser receiver, the tilting plate is disposed at a front bottom of the laser receiver, the tilting target is laid on a surface of the tilting plate, the front camera is mounted on a front top of the laser receiver, a lens of the front camera faces the tilting target, the plane reflecting mirror is disposed on a top of the laser receiver, the plane reflecting mirror is disposed at a middle bottom of the laser receiver, the non-reflective target is disposed at a rear bottom of the laser receiver, the rear camera is mounted at a rear top of the laser receiver, and a lens of the rear camera faces the non-reflective target.

2. The system according to claim 1, characterized in that the laser sensor comprises: a laser sensor housing, the laser device for emitting laser, a horizontal slider and horizontal screw for adjusting a horizontal pointing direction of the laser device, and a vertical slider and vertical screw for adjusting a vertical pointing direction of the laser device; the horizontal screw and the vertical screw are connected to the laser sensor housing, and rotated through a horizontal adjustment nut and a vertical adjustment nut; and a front part of the laser device is connected to the horizontal slider, and a rear part of the laser device is connected to the vertical slider.

3. The system according to claim 1, characterized in that the laser receiver further comprises a rotating shaft capable of rotating freely and a supporting rod with a changeable length, a front part of the tilting plate is rotatably connected to a bottom plate of the laser receiver through the rotating shaft, and a rear part of the tilting plate is connected to the bottom plate of the laser receiver through the supporting rod.

4. The system according to claim 1, characterized in that the plane reflecting mirror and the plane reflecting mirror are parallel.

5. The system according to claim 1, characterized in that the tilting target and the non-reflective target are marked with scales.

6. A data analysis method for a system for synchronous monitoring of multi-point displacement and rotation responses of a structure, based on the system according to claim 1, and characterized in that the method for analyzing structural displacement and rotation response data monitored by a single laser sensor comprises the following steps:

step 1: determining an internal three-dimensional spatial coordinate system of a laser receiver for receiving laser, wherein an x-axis and a z-axis are parallel to a bottom surface of the laser receiver for receiving laser, and a y-axis is perpendicular to the bottom surface of the laser receiver for receiving laser;

step 2: selecting structural displacement and rotation responses at a certain moment as a monitoring reference value, expressing structural displacement and rotation responses at other moments as offsets relative to the reference value, and establishing a measurement plane corresponding to the monitoring reference value for the structural displacement and rotation responses according to operations in steps 3 to 10;

step 3: taking a picture of a spot projected by laser emitted by the laser sensor on a tilting target through a front camera, and identifying position coordinates of a laser spot center point A1 at an intersection point in a plane of the tilting target through image recognition technology in combination with coordinates of a scale on the tilting target in the picture;

step 4: taking a picture of a spot projected by the laser emitted by the laser sensor on a non-reflective target through a rear camera, and identifying position coordinates of a laser spot center point B1 at an intersection point in a plane of the non-reflective target through the image recognition technology in combination with coordinates of a scale on the non-reflective target in the picture;

step 5: obtaining three-dimensional spatial coordinates of the spot center points A1 and B1 in the internal coordinate system of the laser receiver through geometric relationship conversion according to an internal component size of the laser receiver, the plane coordinates of the laser spot center point A1 on the tilting target, the plane coordinates of the laser spot center point B1 on the non-reflective target, and the angle between the tilting target and the bottom plate of the laser receiver;

step 6: establishing a virtual image target of the non-reflective target above the laser receiver, wherein the virtual image target is parallel to the non-reflective target, a vertical distance from the non-reflective target is (n+1)H, H is a vertical distance between a plane reflecting mirror and a plane reflecting mirror, n is the number of laser reflections between the plane reflecting mirror and the plane reflecting mirror, the spot center point B1 on the non-reflective target is projected vertically onto the virtual image target to form an intersection point C1, and since the intersection point C1 has the same x-axis and z-axis coordinates in the coordinate system of the laser receiver as the spot center point B1, spatial coordinates of the intersection point C1 in the coordinate system of the laser receiver are obtained;

step 7: based on the fact that the intersection point C1 is on an extension line of reflected laser from the tilting target according to a geometric reflection relationship, establishing an equation of a straight line passing through the intersection point C1 and the spot center point A1 in space according to the coordinates of the intersection point C1 and the spot center point A1 in the coordinate system of the laser receiver;

step 8: obtaining, according to a principle that an angle between incident laser and a normal of a flat mirror is equal to an angle between reflected laser and the normal of the flat mirror when laser is reflected by the tilting target, an equation of a straight line in space of incident laser passing through the spot center point A1 on the tilting target;

step 9: establishing, according to the equation of the straight line in space of the incident laser passing through the spot center point A1 on the tilting target, a structural displacement and rotation response projection plane that passes through the spot center point A1 on the tilting target and is perpendicular to the equation of the straight line in space of the incident laser, and setting an origin of coordinates of the projection plane at the spot center point A1;

step 10: establishing the structural displacement and rotation response measurement plane parallel to the projection plane at a point D1 of a front end of the laser sensor, wherein an origin of coordinates of the measurement plane is set at the point D1, when the structural displacement and rotation responses are taken as a reference value, laser emitted by the laser sensor passes through the origin of the measurement plane and is perpendicular to the measurement plane, and in-plane coordinate systems of the measurement plane and the projection plane are parallel;

step 11: based on the fact that when the structure is translated and rotated with respect to the reference value thereof, a position and pointing direction of the laser emitted by the laser sensor are changed, resulting in a change in positions of laser spots projected on the tilting target and the non-reflective target in the laser receiver, assuming that the laser sensor produces translation by $(x_0, y_0)$ in the measurement plane and generates a rotation angle $(\theta_x, \theta_y)$ around the x-axis and the y-axis;

step 12: taking a picture of a spot projected by laser emitted by the laser sensor after the translation and rotation on the tilting target through the front camera, and identifying position coordinates of a laser spot center point A2 at an intersection point in the plane of the tilting target through the image recognition technology in combination with the coordinates of the scale on the tilting target in the picture;

step 13: taking a picture of a spot projected by the laser emitted by the laser sensor after the translation and rotation on the non-reflective target through the rear camera, and identifying position coordinates of a laser spot center point B2 at an intersection point in the plane of the non-reflective target through the image recognition technology in combination with the coordinates of the scale on the non-reflective target in the picture;

step 14: obtaining three-dimensional spatial coordinates of the spot center points A2 and B2 in the internal coordinate system of the laser receiver through geometric relationship conversion according to the internal component size of the laser receiver, the plane coordinates of the laser spot center point A2 on the tilting target, the plane coordinates of the laser spot center point B2 on the non-reflective target, and the angle between the tilting target and the bottom plate of the laser receiver;

step 15: vertically projecting the spot center point B2 on the non-reflective target onto the virtual image target to form an intersection point C2, wherein since the intersection point C2 has the same x-axis and z-axis coordinates in the coordinate system of the laser receiver as the spot center point B2, spatial coordinates of the intersection point C2 in the coordinate system of the laser receiver can be obtained through calculation;

step 16: based on the fact that the intersection point C2 is on an extension line of reflected laser passing through the spot center point A2 on the tilting target according to the geometric reflection relationship, establishing an equation of a straight line passing through the intersection point C2 and the spot center point A2 in space according to the coordinates of the intersection point C2 and the spot center point A2 in the coordinate system of the laser receiver;

step 17: assuming that after translation and rotation of the laser sensor, the point D1 of the front end is moved to a point D2, calculating, according to the principle that the angle between the incident laser and the normal of the flat mirror is equal to the angle between the reflected laser and the normal of the flat mirror when laser is reflected by the tilting target, an equation of a straight line where the incident light is located after translation and rotation of the laser sensor, that is, an equation of a straight line passing through the spot center point A2 and the point D2 of the front end;

step 18: calculating, according to a geometric relationship, an angle between a straight line passing through the two points A1 and D1 and a straight line passing through the two points A2 and D2, wherein the angle is a rotation response of the laser sensor, and the angle is projected onto an x-axis and a y-axis of the measurement plane to obtain the rotation response $(\theta_x, \theta_y)$ of the laser sensor in the two directions;

step 19: calculating, according to the geometric relationship, an intersection point F of the straight line passing through the two points A2 and D2 and the projection plane, and coordinates (x, y) of the point F in the projection plane; and step 20: obtaining, according to the geometric relationship, translation responses of the laser sensor in the x-axis and the y-axis of the measurement plane as $x_0=x-L\theta_x$ and $y_0=y-L\theta_y$, respectively, wherein L is a distance from the point D1 of the front end of the laser sensor to the spot center point A1 on the tilting target in the laser receiver when the laser sensor is in a reference position.

7. The method according to claim 6, further comprising: increasing areas of the tilting target capable of reflecting laser and the non-reflective target in the laser receiver, and adjusting a pointing direction of laser emitted by different laser sensors, wherein the laser of the different laser sensors irradiates different regions of the tilting target and the non-reflective target.

8. The method according to claim 6, further comprising: using a time-division multiplexing method to control an emission status of laser emitted by different laser sensors through remote control, wherein the different laser sensors irradiate laser to the laser receiver at different moments, wherein only one laser sensor irradiates laser to the laser receiver at each moment.

* * * * *